United States Patent [19]
Michail et al.

[11] Patent Number: 5,832,284
[45] Date of Patent: Nov. 3, 1998

[54] SELF REGULATING TEMPERATURE/ PERFORMANCE/VOLTAGE SCHEME FOR MICROS (X86)

[75] Inventors: Michel Salib Michail, South Burlington; Wilbur David Pricer, Charlotte; Sebastian Theodore Ventrone, South Burlington, all of Vt.

[73] Assignee: International Business Machines Corporation, Armonk, N.Y.

[21] Appl. No.: 772,706

[22] Filed: Dec. 23, 1996

[51] Int. Cl.$^6$ .................................................. G06F 1/26
[52] U.S. Cl. .................... 395/750.04; 395/556; 364/557
[58] Field of Search ................ 395/750.04, 750.01, 395/556; 364/492, 557, 550; 340/584

[56] References Cited

U.S. PATENT DOCUMENTS

| | | | |
|---|---|---|---|
| 4,445,083 | 4/1984 | Defalco | 323/273 |
| 5,303,191 | 4/1994 | Eagan et al. | 365/194 |
| 5,422,806 | 6/1995 | Chen et al. | 364/149 |
| 5,440,520 | 8/1995 | Schutz et al. | 365/226 |
| 5,451,892 | 9/1995 | Bailey et al. | 327/113 |
| 5,485,127 | 1/1996 | Bertoluzzi | 331/69 |
| 5,488,288 | 1/1996 | Werner | 323/284 |
| 5,490,059 | 2/1996 | Mahalingaiah et al. | 364/166 |
| 5,498,971 | 3/1996 | Turnbull et al. | 324/760 |
| 5,502,838 | 3/1996 | Kikinis | 395/556 |
| 5,713,030 | 1/1998 | Evoy | 395/750.04 |
| 5,721,837 | 2/1998 | Kikinis et al. | 395/281 |
| 5,752,011 | 5/1998 | Thomas et al. | 395/556 |

*Primary Examiner*—Gopal C. Ray
*Attorney, Agent, or Firm*—Richard M. Kotulak

[57] ABSTRACT

A processor which optimizes performance opportunistically by using a hierarchy of variables comprising voltage, clocking and the operations being performed by the processor or its system. The invention accomplishes performance optimization by defining various states with the goal that the processor stays in an optimal performance state of accelerated voltage and clock when the processor executional units are operating. The states are selected by a logic network based on information that is provided by temperature sensors and a performance control. The logic network can be envisioned as an UP-DOWN counter. The counter can be advanced UP or DOWN the state "ladder" as the conditions warrant.

18 Claims, 4 Drawing Sheets

General structure of Performance/Power control

General structure of Performance/Power control

SELF REGULATING TEMPERATURE/ PERFORMANCE/VOLTAGE SCHEME FOR MICROS (X86)

BACKGROUND

Today, very few alternatives exist to control the microprocessor's power and temperature when a microprocessor is running. This is true for both mobile and desk-top personal computers. A microprocessor system is often designed assuming that the microprocessor will be used continuously at its worst case power dissipation. Extensive system verification is performed to ensure that this design condition can be met, before the product can be released into production.

Today's microprocessors feature multiple reduced power states which can be activated when the microprocessor system is not busy. In X86 class microprocessors, these features are usually called SMM (System Management Mode). Power consumption can be reduced to progressively lower levels by:

Halting logical operations within the microprocessor

Stopping the clock to the microprocessor

Turning power off to the microprocessor

These are particularly useful features for mobile personal computers where the battery life is limited. However, all of the above procedures completely stop productive work by the microprocessor.

As a "fail-safe" mode, some systems have installed power sensors with external logic to turn down the clock in the event of a thermal overrun. When this "fail-safe" mode is activated, the resulting performance degradation can be quite severe, i.e. ten times.

Other microprocessor innovations seek to operate the microprocessor at or near some specified operating characteristics. E.g., U.S. Pat. No. 5,488,288 to Elmer teaches the use of a voltage regulator that responds to temperature and process variations and compensates for switching speed fluctuations by generating an internal operating voltage and controlling it such that it compensates for these fluctuations.

U.S. Pat. No. 5,498,971 to Turnball teaches the use of an on-chip circuit element which has parameters that vary as a function of temperature and the use of off-chip circuitry to both measure the die temperature and slow the clock frequency of the circuit during excessive temperature conditions. This is done by supplying two predetermined voltages, each generated by a circuit element that varies with temperature, to the output pins of the die, measuring the voltage difference and generating a signal representative of the die temperature which is used to control the clock frequency.

U.S. Pat. No. 5,440,520 to Schutz et al is another solution in which a voltage map is coupled to a temperature sensing unit. Schutz uses predetermined voltage and temperature relationships to increase the voltage during periods of high chip temperature that would otherwise degrade the performance of the microprocessor chip. Schutz also uses a set of predetermined device characteristics to limit the increase within specified limits.

The focus of all these latter solutions is on using voltage and temperature to stabilize performance or to prevent thermal overrun. Performance is often gauged by measuring one of the two parameters against the other. Other operational characteristics are ignored.

These solutions fail to exploit an opportunity. A great deal of the time the microprocessor is not at its maximum power dissipation and it rarely approaches its maximum safe temperature. Even systems that attempt to stabilize performance over a variety of temperature ranges don't fully exploit the fact that most of the time the microprocessor and its system could support more operations.

This invention uses both temperature and voltage opportunistically. It exploits the fact that a microprocessor system is rarely running at its worst case power dissipation. It monitors the system in a variety of ways; employing variables beyond temperature and voltage. Any action taken to optimize system performance becomes a function of the activities being performed or not being performed rather than waiting until these activities produce a result that requires action effecting either voltage or temperature.

SUMMARY OF THE INVENTION

It is therefore an object of this invention to create a method and system for managing the performance of a microprocessor that uses various activity states and variables to maximize the performance of a microprocessor system.

It is another object of this invention to provide a strategy and mechanism which opportunistically take advantage of the differences between optimum design conditions and typical operating conditions of voltage and temperature that are usually not at the worst case conditions for a microprocessor.

Another object of this invention is to keep a microprocessor or microprocessors operating within its optimum performance region as frequently as possible.

These objectives are satisfied according to this invention by monitoring the temperature of the microprocessor continuously, and introducing other variables to keep the microprocessor operating at its instantaneous maximum allowable performance.

These variables comprise: supply voltage, clocking and function. The processor alone can determine the best combination of these variables to tune its performance to a maximum dependant upon the functions being executed in real time and within the constraints of the real time environment. The processor can, for instance, be operated beyond the normal voltage design limit, if the temperature is known to be within some bounds.

In support of the goal to stay in the maximum performance range of the system for as much time as possible, a number of operating states are defined. While in each state the processor and its system, monitor the environmental and executional state of the system and processor in real time. Movement between states is based on the parameters chosen for monitoring.

A processor performance control module will control the states and resulting actions and will have continuous input from the on-chip temperature sensing device. Upon every "n" clock boundary the processor will evaluate the current operating conditions to determine what action is to be taken and what state it should be in.

BRIEF DESCRIPTION OF THE DRAWINGS

The present invention is illustrated by way of example and not limitation in the figures of the accompanying drawing in which like references indicate similar elements.

DETAILED DESCRIPTION OF THE INVENTION

The functions operating at any moment by a processor are important parameters to be considered in performance maximization. The action taken may be determined in part by the program under execution. To exploit this end, the processor will keep an ongoing status of the instruction type(s) in execution. These instruction types can be broadly characterized as:

Bus transactions

Branch functions

Register transfers

Arithmetic operations

Each of these functions have associated dedicated hardware. In superscalar microprocessors, this hardware is often in the form of separate units; and there may be multiple copies of such units. For example: there may be two arithmetic units. In some cases, the units may be further broken down into more elementary units such as 'rotate', 'add', 'or', etc.

In super scalar microprocessors, more than one type of operation can be in execution at any one time. To achieve optimum performance, it would be best to monitor all such activity and selectively activate operations not only to achieve the desired throughput but also to assure that the processor is operating close to its performance limits.

Figure 1:
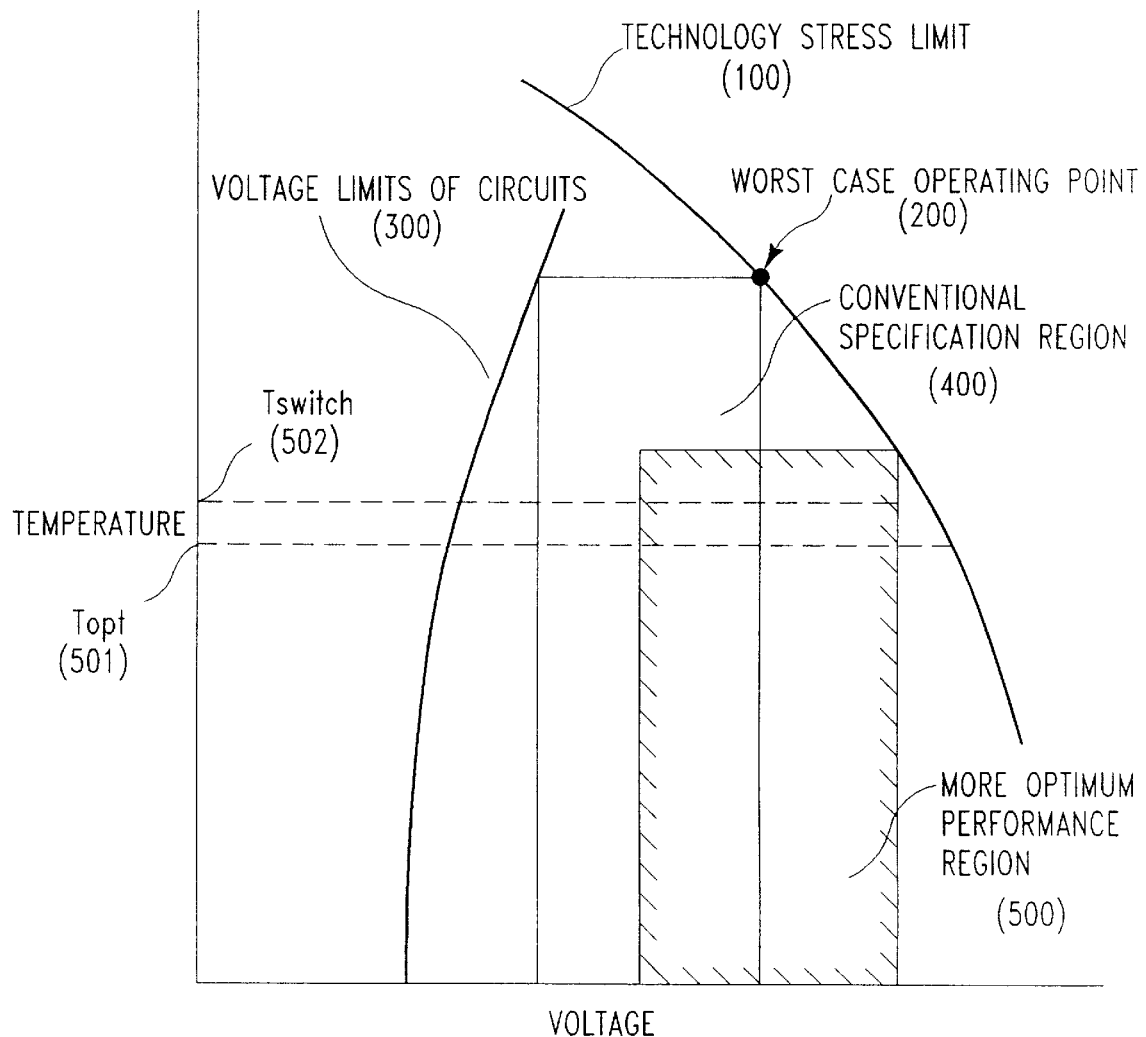
FIG. 1 is a nomograph with axes of temperature and voltage which depicts regions in which a microprocessor may be operated.

FIG. 1 shows a nomograph, with axes of temperature and voltage, depicting regions in which a microprocessor might be operated. The boundary to the left is determined by the lowest voltage at which the circuits will operate satisfactorily. The boundary to the right is determined by the safe stress level of the technology. Notice this rightmost boundary is a function of both temperature and voltage.

The dot 200 to the upper right portrays a typical specification sheet's "worst case operating point". A rectangle 400 determined by this point and a low voltage operating limit at similar temperature defines the specified operating conditions. Notice that the technology can safely support higher operating voltages, and by implication, higher performance; IF the worst case temperature is not approached. Indeed, under normal operating conditions, the worst case temperature is rarely approached. The shaded rectangle 500 portrays a more optimum performance region which the real time temperature will frequently allow.

The purpose of this invention is to keep the microprocessor operating within this more optimum performance region as shown by the shaded rectangle 500 as frequently as possible. In support of this goal, a number of other operating states are defined which decrease power dissipation and therefore operating temperature.

Figure 2:
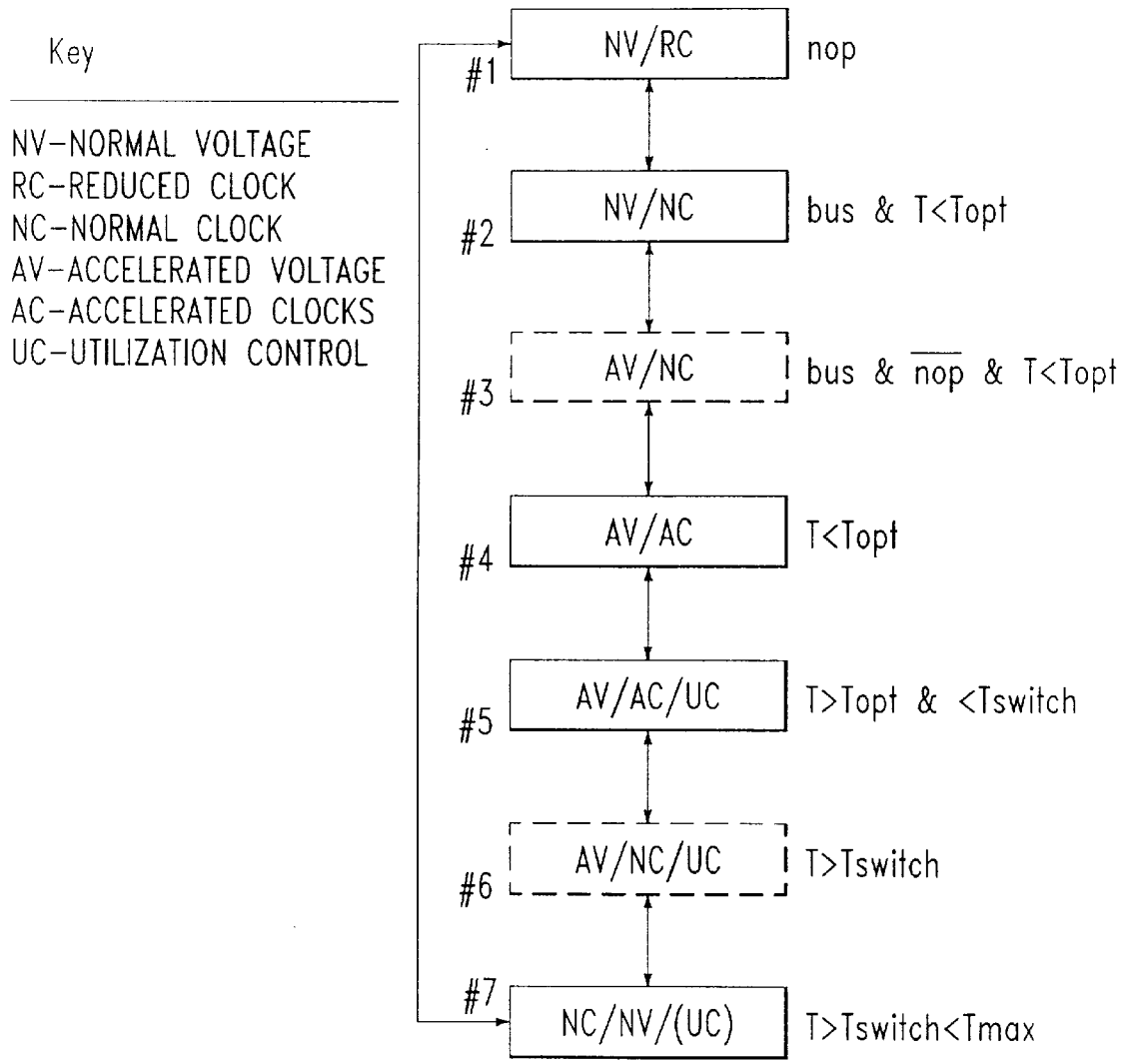
FIG. 2 is a flowchart which illustrates the flow of the switching control of this invention as well as its states.

Referring now to FIG. 2; a "Switching Control Flow Diagram" for this invention is shown. The more optimum performance region is the box marked 4. It is characterized by: Accelerated Voltage (AV) and Accelerated Clock (AC) and by no constraints upon the full utilization of any of the microprocessor function.

Other operation states are represented by other boxes. These boxes are arranged in a ladder. The bidirectional arrows indicate that the microprocessor may switch between adjacent operational states on the ladder; or, under special conditions, between the top and the bottom of the ladder. A key in the upper left hand corner defines the operating conditions within each box.

Normal Voltage (NV)

Normal Voltage means the conventional design voltage to which a prior art microprocessor would have been designed.

Reduced Clock (RC)

Reduced Cock means a much lower clock frequency than the Normal Clock or the Accelerated Clock.

Normal Clock (NC)

Normal Clock means the conventional clock frequency to which a prior art microprocessor would have been designed.

Accelerated Voltage (AV)

Accelerated Voltage means a higher operating voltage allowed as appropriate when the temperature conditions are met.

Accelerated Clock (AC)

Accelerated Clock means the higher clock frequencies permissible when the Accelerated Voltage is applied and the temperature conditions are met.

Utilization Control (UC)

Utilization control means the microprocessor has placed some constraints on the otherwise full utilization of all the microprocessor's internal function. This is a subtle "slow down mode" which does not require a change in clock frequency.

Boxes shown in dotted outline represent transitory states. They exist only because the microprocessor cannot instantaneously switch to the Accelerated Clock without first switching to Accelerated Voltage. Conversely before switching back to Normal Voltage, the microprocessor must first switch back to Normal Clock.

We will now consider each of these boxes starting from the top.

State #1 NV/RC

The microprocessor switches to this very low power state whenever it detects a string of No-Op instructions. This state reduces power and depresses temperature. The resultant lower quiescent temperature will be of advantage when the microprocessor encounters a flurry of activity at some later time.

State #2 NV/NC

The microprocessor resides in this state whenever it detects only bus activity and when the real time temperature is below Topt OR when transitioning between states #1 and #4. Topt is a temperature well below the worst case temperature at which it has been determined that higher voltage and higher frequency operation are possible and not deleterious to the technology. This point is typically chosen at the high temperature end of the more optimum performance region 500 shown in FIG. 1 within some acceptable tolerance of the technology stress limit. Topt is shown as 501 in FIG. 1.

State #3 AV/NC

As described earlier, this is a transitory state.

State #4 AV/AC

This is the 'more optimum performance region' which was described earlier. This state/region is used for periods of high and productive activity. The microprocessor may remain in state #4 only so long as the temperature is under Topt. Refer to the description of "State #2" for a definition of Topt.

State #5 AV/AC/UC

State #5 is somewhat similar to state #4. State #5 is triggered when the microprocessor sensors detect that the semiconductor substrate temperature has exceeded Topt. The microprocessor remains at Accelerated Voltage and at Accelerated Clock, BUT the power dissipation is limited by exercising sagacious control over the percent utilization of its various internal microprocessor functions. This concept is described in more detail below.

State #6 AV/NC/UC

This is another transitory state. The transition through state #6 to state #7 is triggered when the microprocessor sensors detect that the semiconductor substrate temperature has exceeded Tswitch. Tswitch is a temperature only slightly higher than Topt. Exceeding temperature Tswitch signifies that application of the utilization control has not been sufficient to arrest a further temperature rise. More drastic controls must now be applied. Tswitch is indicated by 502 in FIG. 1 and is typically closer to the technology stress limits established for the more optimum performance region 500. It is at a point where the measures taken to arrest a further temperature rise will safely keep the processor from exceeding the technology stress limits.

State #7

In state #7 the microprocessor reverts to Normal Clock and Normal Voltage while continuing to apply control over the percent utilization of the various internal microprocessor functions. State #7 is intended to be within the worst case design limit. See area 400 in FIG. 1. Since this is the typical performance region, the microprocessor could remain in this state forever. However, according to this invention in most cases the microprocessor will return to either state #5 or state #4 soon after entering state #7.

It should be noted that the microprocessor may go directly to state #1 from #7, if a string of No-Ops is detected. However, it may not proceed from there into state #2 until the temperature has first dropped below Topt.

Figure 3:
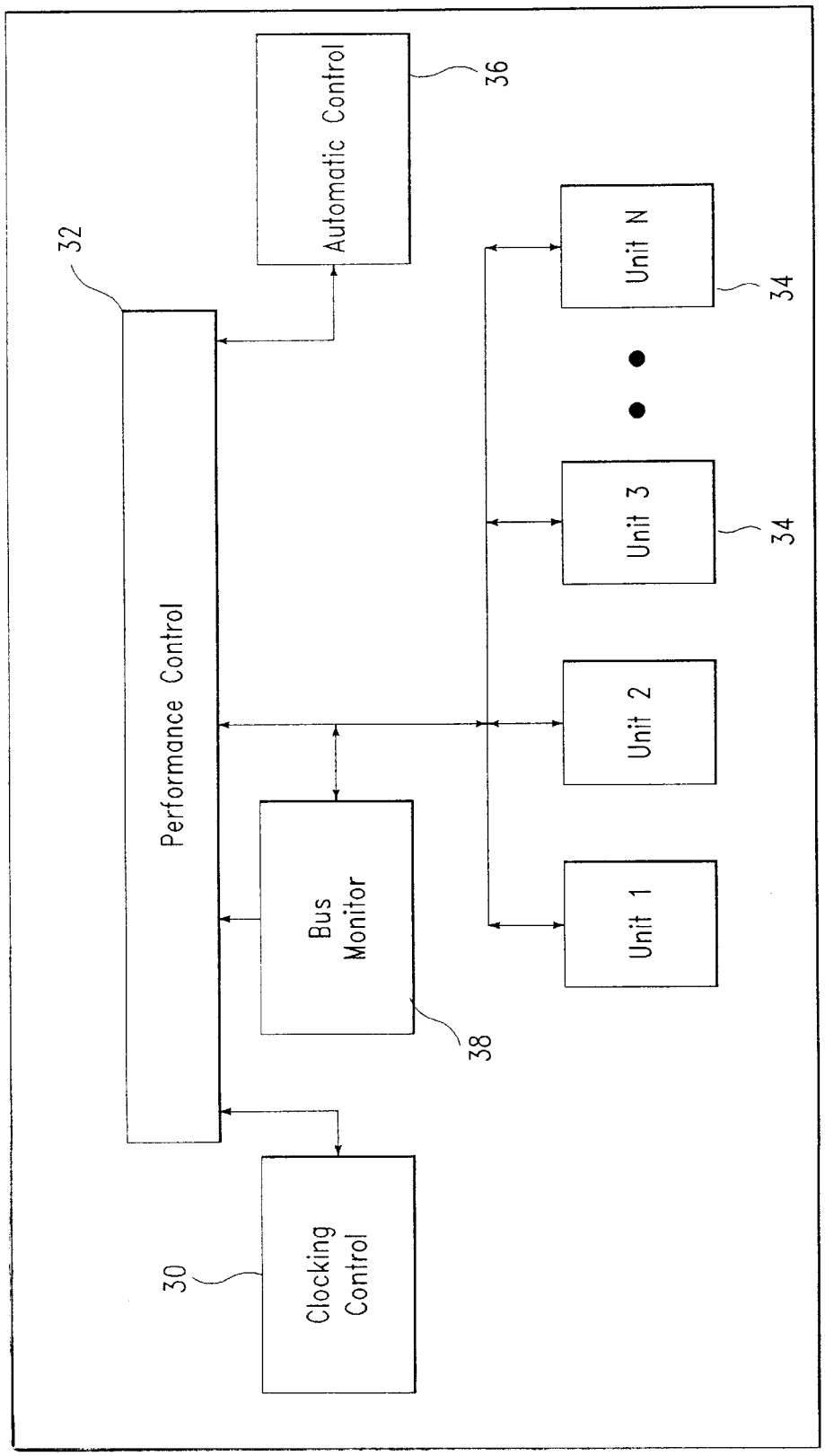
FIG. 3 is a block diagram of the performance control and automatic control of this invention and related inputs and outputs.
Figure 4:
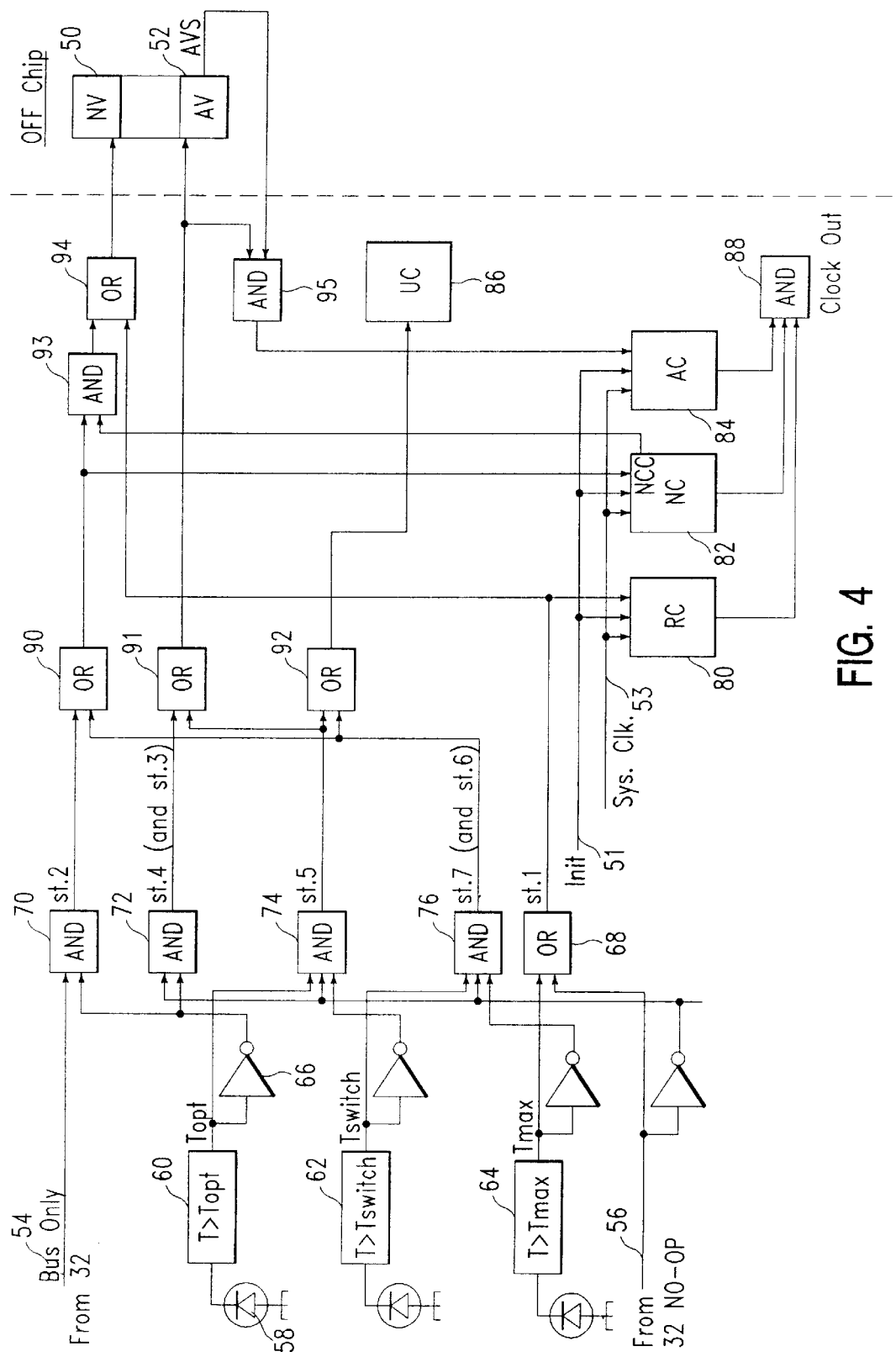
FIG. 4 is a diagram using simple logic blocks of the automatic control logic of this invention.

As mentioned above switching between States #4 and #5 invokes certain utilization controls. Under normal conditions and normal programming it is anticipated that the microprocessor will usually be in state #4. Small peaks of activity may momentarily, however, bring it to state #5. State #5 is more subtle and effective than simply and crudely lowering the clock frequency. State #5 seeks to load level the peaks of activity by limiting how frequently some of the microprocessor functions may be used. Clearly high power functions, especially those unlikely to effect smooth performance will be curtailed first. FIGS. 3 and 4 illustrate the paths of interaction to accomplish this load leveling.

FIG. 3 is a block diagram of the performance control circuit which is used to manage the functioning of the processor and its system. Performance control block 32 provides operational information to automatic control 36 and receives utilization control information from automatic control 36 to manage the percentage utilization of various units of the microprocessor. For example, it can be connected to the arithmetic unit, floating point unit and other more elementary units generally shown as blocks 34 on FIG. 3.

Additionally control 32 detects bus activity through bus monitor 38 over the processor's buses and sends this information on to the automatic control block 36. Performance control also inputs and receives information from clocking control circuit 30. These inputs are also used to develop the utilization ratio and to provide system clock and initialization information to the automatic control block 36. Generally, control of the processor units 34 is highly dependent on the processor's architecture and performance of the particular processor under consideration. For example, architectural considerations may dictate different utilization percentages for control of different units 34, since one unit may be more important in terms of performance or dependency than another. Based on a matrix of the importance and utilization the clocking on a unit or units may be modified by the performance unit.

The network forming the automatic control block 36 is shown in greater detail in FIG. 4. This automatic control block controls both the supply voltage and the clock frequency. Because the voltage regulator function exhibits high power dissipation, this function is typically physically separate from the microprocessor chip. In FIG. 4 the voltage regulation function is shown to the right of the hashed lines and is represented by 50 which is normal voltage (NV) and 52 which is the accelerated voltage (AV). As shown in FIG. 4 in the preferred embodiment, all other portions of the Automatic Control Block reside on the microprocessor chip.

The UP-DOWN counter directly controls the off chip voltage regulator (50 and 52) which switches directly between two voltages: NV and AV. The Automatic Control Block is programmed to allow enough time for the voltage regulator to complete its transition up between voltages before the corresponding clock frequency transition.

The Automatic Control Block also controls the clock frequency; stepping it between: RC, NC and AC. Once again the Automatic Control Block is programmed to allow enough time for the clock generator to complete these transitions down before the corresponding supply voltage transitions.

The actual control can be envisioned as an UP-DOWN counter with a reset input for initialization (line 51). The counter can be advanced UP or DOWN the "ladder" as the conditions warrant. The conditions necessary to advance the UP-DOWN counter are decoded with simple logic blocks. Advances in the UP-DOWN counter are made only on clock cycle boundaries, and may span a number of No-Op cycles. System clock line 53 provide this synchronization.

In actual practice inputs to these simple logic blocks include information from the Performance Control Block such as:

\*Is a string of No-Op instructions detected? (56 on FIG. 4)

\*Are the instructions "bus only"? (54 on FIG. 4)

The Automatic Control Block also receives inputs from the microprocessor on-chip thermal sensors shown collectively as 58. Temperature sensitive diodes can be used for this purpose. Blocks 60, 62 and 64, each having an inverter (66) are respectively enabled as soon as T>Topt (60), T>Tswitch (62) and T>Tmax (64). Tmax is the maximum temperature specified for operating the processor.

Noting that the No-op signal from performance controller 32 also has an inverter, one can see that gate 68 defines state 1, gate 70 defines state 2, state 4 and transition state 3 are defined by gate 72, gate 74 defines state 5, and gate 76 defines state 7 and transition state 6. If state 1 is true(i.e. either there is a No-op condition or T>Tmax) the reduced clock generator 80 is enabled and the processor clock output 88 is at the reduced clock rate. When there is bus activity and T<Topt, state 2 is enabled. When in state 2 the control through gate 90 enables normal clock (NC) 82 and maintains normal voltage through gate 94 based on a signal returned from NC 82. State 3 is a transitory state that occurs anytime the processor's units start performing operations (move out of state 2) and T<Topt. In this state gate 91 enables the accelerated voltage regulator (AV) 52. After AV is enabled, a signal is sent through gate 95 to enable the accelerated clock (AC) 84 and the processor is now in state 4. State 5 is enabled through gate 74 when Topt<T<Tswitch. This moves the processor and the system into utilization control (UC) 86. In this state the performance control 32 attempts to stabilize the power dissipation by curtailing the activities of units 34.

States 6 is a transitional phase where T>Tswitch. In this state gate 76 through gate 90 first turns on normal clock 82 and then through gates 93 and 94 asserts normal voltage (50). The system is then in state 7 and remains there until the temperature exceeds Tmax or is less than Tswitch. If the temperature exceeds Tmax the system moves to state 1. But if the temperature is reduced to less than Tswitch the system moves back to state 5.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor having first and second clocking frequencies differing from one another and greater than zero, and first and second operating voltages differing from one another and greater than zero, comprising:

a) a temperature sensing circuit providing a temperature signal which corresponds to the current temperature of the processor;

b) a performance control which monitors functional operations of the processor; and c) a logic network which receives information from the performance control and the temperature sensing circuit to select appropriate combinations of said first and second clocking frequencies and said first and second operating voltages, and to control operation of the processor.

2. The invention of claim 1 further comprising:

d) a utilization control module which is part of the performance control and coupled to the logic network which constrains the operation of one or more of the processor's functional units based on the information supplied to the logic network.

3. The invention of claim 2 where the utilization control module is enabled by one of the states when the temperature sensed exceeds an optimal temperature.

4. The invention of claim 3 where one of the states provides for an accelerated voltage and clock which are enabled when the temperature sensed is below the optimal temperature.

5. The invention of claim 4 where one of the states provides for a normal voltage and clock when the temperature sensed is outside the range of temperature chosen for accelerated voltage and clock.

6. The invention of claim 5 where one of the states provides for normal voltage and clock when the performance control detects only bus activity and the temperature sensed is below the optimum temperature.

7. The invention of claim 6 where one of the states provides for a reduced clock rate when either the performance control detects a series of no-op instructions or the temperature is above the maximum temperature specified for the processor.

8. The invention of claim 5 where one of the states provides for a reduced clock rate when either the performance control detects a series of no-op instructions or the temperature is above the maximum temperature specified for the processor.

9. The invention of claim 3 where one of the states provides for a normal voltage and clock when the temperature sensed is outside the range of temperature chosen for accelerated voltage and clock.

10. The invention of claim 2 where one of the states provides for a normal voltage and clock when the temperature sensed is outside the range of temperature chosen for accelerated voltage and clock.

11. The invention of claim 2 where one of the states provides for an accelerated voltage and clock which are enabled when the temperature sensed is below the optimal temperature.

12. A method for optimizing the performance of a processor having a plurality of functional units, comprising the steps of:

a) Switching from a normal activity state to an accelerated activity state when at least one of said plurality of functional units are operating and the sensed temperature of the processor is below an optimum temperature for operation at the accelerated activity state;

b) Enabling a utilization control which constrains operation of at least one of said plurality of functional units of the processor when the sensed temperature of the processor is between the optimum temperature and a not to exceed temperature for the accelerated activity state; and c) Switching from the accelerated activity state to a normal activity state when the sensed temperature of the processor is greater than the not to exceed temperature for operating at the accelerated activity state.

13. The method for optimizing the performance of processor in claim 12 where the normal activity state comprises normal clock and voltage and the accelerated activity state comprises accelerated clock and voltage and full function execution by at least some of said plurality of functional units.

14. The method of claim 13 also comprising the steps of:

d) Entering a reduced clock state when the processor detects a series of no-op instructions; and e) Moving from a reduced clock state or from an accelerated voltage and clock state to a normal activity state when the sensed temperature of the processor is below the optimum temperature and there is bus activity only.

15. The method of claim 14 also comprising the step of f) Switching to the reduced clock state anytime the sensed temperature of the processor is greater than a specified temperature for the processor.

16. An apparatus for optimizing the performance of processor having a plurality of functional units, a variable clock, and a variable voltage, comprising:

a) means for switching to an accelerated voltage and clock state from a normal voltage and clock state when at least one of said plurality of functional units are operating and the sensed temperature of the processor is below an optimum temperature for operation at the accelerated voltage and clock state;

b) means for enabling a utilization control when the temperature sensed temperature of the processor is between the optimum temperature and a not to exceed temperature for the accelerated voltage and clock state, said utilization control constraining operation of at least one of said plurality of functional blocks; and c) means for switching from the accelerated voltage and clock state to the normal activity state when the temperature sensed is greater than the not to exceed temperature for operating at an accelerated voltage and clock state.

17. The apparatus of claim 16 also comprising:

d) means for entering a reduced clock state when the processor detects a series of no-op instructions; and e) means for moving from a reduced clock state or from an accelerated voltage and clock state state to a normal activity state when the sensed temperature of the processor is below the optimum temperature and there is bus activity only.

18. The apparatus of claim 17 also comprising:

f) means for switching to the reduced clock state anytime the sensed temperature of the processor is greater than a specified temperature for the processor.

* * * * *